Jan. 6, 1953 W. I. JONES 2,624,090
EASY ACTION SNAP FASTENER
Filed Nov. 14, 1949
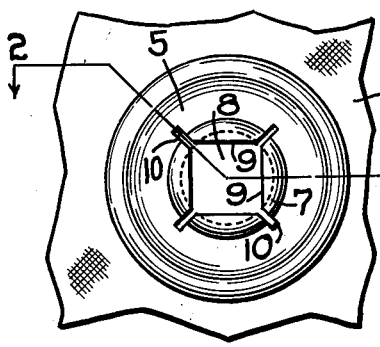
FIG. 1.
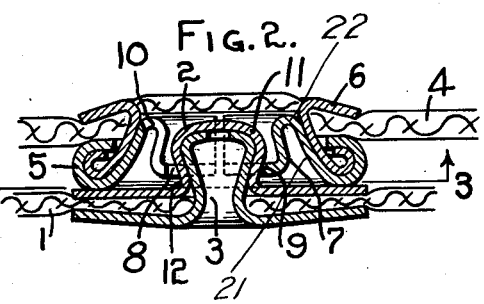
FIG. 2.
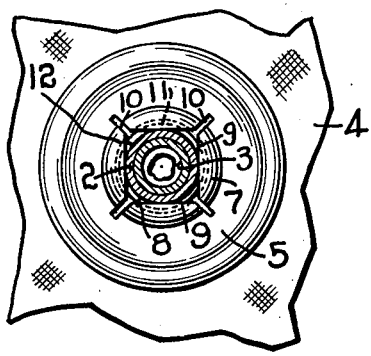
FIG. 3.
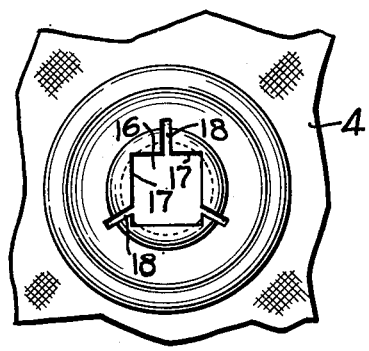
FIG. 5.
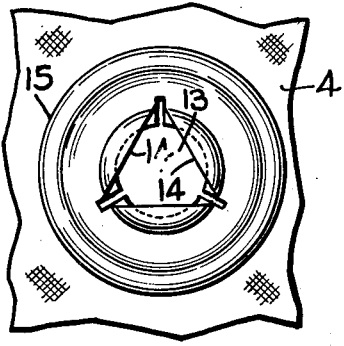
FIG. 4.
FIG. 6.
INVENTOR:
WALTER I. JONES,
BY Philip E Parker
ATTORNEY.

Patented Jan. 6, 1953

2,624,090

UNITED STATES PATENT OFFICE 2,624,090

EASY ACTION SNAP FASTENER

Walter I. Jones, Somerville, Mass., assignor to United-Carr Fastener Corporation, Cambridge, Mass., a corporation of Massachusetts Application November 14, 1949, Serial No. 127,119

8 Claims. (Cl. 24—217)

My invention aims to provide improvements in so-called laundryproof fasteners such as shown in U. S. Letters Patent 2,106,728 and 2,300,292.

The important object of this invention is to construct a laundryproof fastener for frail and delicate material that will provide a light but secure snap fastener action that cannot be provided by the previously known and used fasteners.

Another object is to provide the desired fastener action while keeping the strength to prevent distortion against undue lateral strains.

Referring now to the various embodiments of my invention illustrated by the drawings:

Fig. 1 is a plan view of a socket installation showing a square stud receiving aperture and four slots;

Fig. 2 is a section taken on the line 2—2 of Fig. 1;

Fig. 3 is a section taken on the line 3—3 of Fig. 2;

Fig. 4 is a plan view of a modified socket construction showing a triangular aperture and three slots;

Fig. 5 is a modified form of socket showing a square aperture and three slots; and Fig. 6 is a further modified form showing convex rather than straight edged stud-engaging portions.

My invention resulted from the experience with existing laundryproof fasteners with which various snap actions may be provided by sizing the stud receiving aperture, preferably when attaching. However, it is impossible to provide a light snap action that is anywhere near uniform or secure enough to hold on light weight material such as silk, rayon, plastic film etc.

After careful study I found that concaved edges were not suitable for my purpose because they provided too much "drag" during the snapping and unsnapping and to open the apertures for easy action brought out all the manufacturing tolerances so that there was too much, too little, or no snap action.

I found that, by providing straight edges or slightly convex edges at the aperture, I could retain the right size hole for good resiliency and yet have easy action. Both the holding power and the action are excellent for the types of material previously mentioned. By providing straight or convex stud engaging edges, I eliminate the "corners" of the usual fastener socket construction because those "corners" dig into the stud during the snapping action and cause an unwanted "drag" or resistance.

Referring first to the fastener construction shown in Figs. 1, 2, and 3, there is illustrated a well-known socket and stud construction except for the formation of the socket aperture and stud-engaging edges. The installation shown in Fig. 2 includes a supporting material (preferably flexible and relatively weak), a snap fastener stud 2, on one side of the material 1 and an attaching element 3 holding the stud 2 in place. A second piece of material 4, similar to the material 1, is provided with a laundryproof type of socket 5, secured in place, for engagement with the stud 2, by a pronged ring 6.

The preferred socket has a substantially tubular stud receiving portion 7 having a stud receiving aperture 8 at one end. This aperture 8 is preferably rectangular and is bordered by straight stud engaging edges 9. The tubular stud receiving portion 7 is divided longitudinally by four slits 10 to provide resiliency so that the aperture 8 may be enlarged to permit passage of the head 11 of the stud so that the stud-engaging edges may engage with the neck 12 of the stud as shown in Fig. 2.

The tubular stud-receiving portion or barrel 7 is disposed axially of the fastener and is connected at the end opposite the stud-receiving aperture 8 to an annular ring part 21 by means of a resilient bight portion 22 as shown in Fig. 2 so that the stud-engaging edges 9 are displaced radially upon passage of the stud head through the aperture, thus reducing resistance to a minimum and permitting the fastener to be used upon frail and delicate material.

With this construction it is readily seen (Fig. 3) that the round head 11 of the stud 2 makes only tangential pivot contacts with the stud-engaging straight edges 9 as it passes into or out of the aperture 8. Thus resistance is reduced to a minimum while the grip on the stud is maximum and yet providing an easy flexible snap action. Furthermore, the strength of the socket is maintained for lateral stresses and strains.

In Fig. 4 I have shown a modified socket construction so as to be provided with a triangular aperture 13 bordered by three straight stud-engaging sides 14 and three slits 15.

The modified construction of socket shown in Fig. 5 shows a rectangular aperture 16, with four straight stud-engaging edges 17 and three slits 18.

The modified socket illustrated in Fig. 6 is the same as shown in Figs. 1, 2 and 3 except that the stud-engaging edges 19 are convex.

From the above description of my invention and the various illustrations by the drawings, it will be seen that I may secure the desired results by variation in construction. Therefore I am not limited to a specific arrangement and my invention is best covered by the following claims.

I claim:

1. A one-piece snap fastener socket member for engaging a snap fastener stud having a substantially cylindrical shank and a bulbous nose, said socket comprising an annular ring portion and a reversely extending axial stud-receiving barrel connected at one end by a bight portion to said ring portion and provided at its opposite end with a non-circular stud-receiving aperture bordered by a plurality of inturned free edges, said barrel having a plurality of radial slits extending from said aperture into said bight portion to divide said barrel into a plurality of radially movable resilient fingers, the free edge of each of said fingers being flat and of single thickness and extending on a continuous line between adjacent slits and the central point of said edge being radially inward of other portions thereof to make single point contact with the cylindrical surface of a stud shank or nose and being radially movable under like forces by a stud inserted into or withdrawn from said stud-receiving opening.

2. A snap fastener socket in accordance with claim 1 in which the stud-receiving aperture is triangular and is bordered by three straight flat stud-engaging edges.

3. A snap fastener socket in accordance with claim 1 in which the stud-receiving aperture is rectangular and is bordered by four substantially straight flat stud-engaging edges.

4. A snap fastener comprising in combination, a snap fastener socket and a stud member having a substantially cylindrical shank and bulbous nose, said socket comprising an annular ring portion and a reversely extending axial stud-receiving barrel connected at one end by a bight portion to said ring portion and provided at its opposite end with a non-circular stud-receiving aperture bordered by a plurality of inturned free edges, said barrel having a plurality of radial slits extending from said aperture into said bight portion to divide said barrel into a plurality of radially movable resilient fingers, the free edge of each of said fingers being flat and of single thickness and extending in a continuous line between adjacent slits, the central point of said edge being radially inward of other portions thereof to engage said shank at one point only during engagement and disengagement of said socket and stud members, and said resilient fingers being radially movable under like forces by said stud inserted into or withdrawn from said stud-receiving opening.

5. A snap fastener in accordance with claim 4 in which the aperture of the socket member is substantially triangular in shape and is bordered by three stud-engaging edge sections.

6. A snap fastener in accordance with claim 4 in which the stud-engaging edge sections of the socket member are convexly curved to provide a stud-engaging point intermediate the ends thereof.

7. A snap fastener socket in accordance with claim 1 in which the stud-receiving aperture is generally rectangular in shape and is bordered by four convexed stud-engaging edges.

8. A snap fastener in accordance with claim 4 in which the opening is generally rectangular in shape and is bordered by four substantially straight stud-engaging edges.

WALTER I. JONES.

REFERENCES CITED

The following references are of record in the file of this patent:

UNITED STATES PATENTS

| Number | Name | Date |
|---|---|---|
| 490,435 | Hall | Jan. 24, 1893 |
| 1,209,019 | Pfeiffer | Dec. 19, 1916 |
| 1,302,263 | Woodworth | Apr. 29, 1919 |
| 2,393,219 | Griffin | Jan. 15, 1946 |
| 2,440,685 | Huelster | May 4, 1948 |